United States Patent
Yasumoto et al.

(10) Patent No.: US 8,617,437 B2
(45) Date of Patent: Dec. 31, 2013

(54) FLAME RETARDANT AND FLAME RETARDANT COMPOSITION USING SAME, MOLDED ARTICLE THEREOF, AND ELECTRIC WIRE WITH COATING

(75) Inventors: Kazuhisa Yasumoto, Kanagawa (JP); Mutsunori Gotou, Kanagawa (JP)

(73) Assignee: Sun Allomer Ltd., Tokyo (JP)

( * ) Notice: Subject to any disclaimer, the term of this patent is extended or adjusted under 35 U.S.C. 154(b) by 1005 days.

(21) Appl. No.: 12/600,099

(22) PCT Filed: May 15, 2008

(86) PCT No.: PCT/JP2008/058932
§ 371 (c)(1),
(2), (4) Date: Nov. 13, 2009

(87) PCT Pub. No.: WO2008/143129
PCT Pub. Date: Nov. 27, 2008

(65) Prior Publication Data
US 2010/0212930 A1 Aug. 26, 2010

(30) Foreign Application Priority Data

May 15, 2007 (JP) ............................... P2007-129043
May 13, 2008 (JP) ............................... P2008-126254

(51) Int. Cl.
*C09K 21/02* (2006.01)
*C08K 3/22* (2006.01)
*C08K 3/32* (2006.01)
*H01B 7/295* (2006.01)

(52) U.S. Cl.
USPC ........... 252/609; 252/601; 252/604; 252/606; 524/436; 524/437; 524/450

(58) Field of Classification Search
USPC .......... 252/601, 604, 606, 609; 524/436, 437, 524/450
See application file for complete search history.

(56) References Cited

U.S. PATENT DOCUMENTS 5,561,185 A * 10/1996 Hashimoto et al. ........... 524/436
6,414,059 B1 * 7/2002 Kobayashi et al. ........... 524/101
6,849,217 B1 * 2/2005 Peruzzotti et al. ....... 264/171.19
8,110,629 B2 * 2/2012 Kitano et al. ................. 524/505
2004/0157994 A1 * 8/2004 Kubo et al. ..................... 525/88
2006/0111504 A1 * 5/2006 Morioka et al. .............. 524/502

FOREIGN PATENT DOCUMENTS

| CN | 1371517 A | 9/2002 |
|---|---|---|
| JP | 03-064341 | 3/1991 |
| JP | 05-054723 | 3/1993 |
| JP | 05-239281 | 9/1993 |
| JP | 06-025367 | 2/1994 |
| JP | 07-133386 | 5/1995 |
| JP | 10-182909 | 7/1998 |
| JP | 11-010808 | 1/1999 |
| JP | 2000-006335 | 1/2000 |
| JP | 2001-226530 | 8/2001 |
| JP | 2003-197043 | 7/2003 |
| JP | 2004-010720 | 1/2004 |
| JP | 2004532332 A | 10/2004 |
| JP | 2005-029605 | 2/2005 |
| JP | 2005097504 A | 4/2005 |
| JP | 2005-162931 | 6/2005 |
| JP | 2006-321934 | 11/2006 |
| WO | 02094929 A1 | 11/2002 |

OTHER PUBLICATIONS

Extended European Search Report in European Application No. 08752792.5, mailed Dec. 2, 2011.
Chinese Office Action in Application No. 200880015728.4, mailed May 29, 2012.
International Search Report for PCT International Application No. PCT/JP2008/058932 mailed Aug. 19, 2008.
Office Action in Application No. 2008-126254 (JP) mailed on Jan. 8, 2013.

* cited by examiner

*Primary Examiner* — Joseph D Anthony
(74) *Attorney, Agent, or Firm* — Nixon Peabody LLP

(57) ABSTRACT

The flame retardant of the present invention has a flame retardant (a) component, comprising 50 to 97% by mass of a metal hydrate (a-1) component and 3 to 50% by mass of a filler (a-2) component, wherein the filler (a-2) component contains $SiO_2$, $Al_2O_3$ and $M_{2/n}O$. Here, the total of the metal hydrate (a-1) component and the filler (a-2) component is 100% mass, M represents one or more metal elements selected from a group consisting of K, Na, Mg, Ca, Fe and Zn, and n represents a valence of the metal element. According to the present invention, it is possible to provide a flame retardant capable of providing a molded article and an electric wire with a coating, which are excellent in flame retardancy, abrasion resistance and flexibility, and also have sufficient mechanical strength at low cost.

5 Claims, No Drawings

FLAME RETARDANT AND FLAME RETARDANT COMPOSITION USING SAME, MOLDED ARTICLE THEREOF, AND ELECTRIC WIRE WITH COATING

This application is a U.S. National Phase Application of PCT International Application No. PCT/JP2008/058932, filed May 15, 2009, which claims the priority of Japanese Patent Application No. 2007-129043 filed on May 15, 2007, and Japanese Patent Application No. 2008-126254 filed on May 13, 2008, the contents of which are incorporated herein by reference.

TECHNICAL FIELD

The present invention relates to a flame retardant and a flame retardant composition using the same, a molded article thereof, and an electric wire with a coating.

BACKGROUND ART

Heretofore, a halogen-based flame retardant containing halogen groups, such as chlorine and bromine, has been the mainstream in terms of a flame retardant for flammable materials, for example, various resin materials which are organic polymer materials, or fibers such as lumber, paper, cloth, textiles and nonwoven fabrics. The halogen-based flame retardant is widely used for various building materials, household electrical appliances, automobiles, aircrafts, trains, electric wire materials and the like since it is excellent in balance between flame retardancy and material cost.

However, flame retarding technologies using no halogen-based flame retardant have intensively been developed recently because of such problems as the influence of a combustion gas containing halogen and generation of dioxins due to incineration upon disposal. Among these, a flame retardant using phosphoric acid or boric acid, a method of insulating by forming a foamed film, a flame retardant containing a high concentration of a metal hydrate such as magnesium hydroxide and aluminum hydroxide, or a nonhalogen-based flame retardant as a composite thereof have appeared in a market.

As a nonhalogen-based flame retardant, a nonhalogen-based flame retardant composed mainly of a metal hydrate such as magnesium hydroxide and aluminum hydroxide is mainly used. The metal hydrate is commercially produced in place of the halogen-based flame retardant. For example, a nonhalogen-based flame retardant composed mainly of magnesium hydroxide has satisfactory flame retardancy. Therefore, it is preferably used for electric wire coating of automobile wire harnesses, internal wiring of appliances and power source cords, which require high flame retardancy and mechanical strength.

However, where a nonhalogen-based flame retardant composed mainly of metal hydrate is used in a flame retardant composition, the composition must contain the metal hydrate in large amount so as to exhibits flame retardancy equivalent to that of the flame retardant composition containing a halogen-based flame retardant. However, when the flame retardant composition contains a large amount of the metal hydrate, abrasion resistance, low temperature characteristics and mechanical strength, such as tensile breaking strength or tensile breaking elongation, of a molded article deteriorate. Furthermore, the flame retardant composition containing a high concentration of the metal hydrate is likely to cause peeling at the interface between the metal hydrate and a resin and the obtained molded article is drastically whitened, and also flexibility of the molded article deteriorates.

Therefore, in the nonhalogen-based flame retardant composed mainly of the metal hydrate, it is required to develop those, which enables a good balance between mechanical strength and flexibility of the molded article of the flame retardant resin composition by reducing the content of the metal hydrate, and still can secure sufficient flame retardancy.

To meet such a requirement, Patent Document 1 proposes a flame retardant composition comprising an α-olefin (co) polymer, an ethylene (co)polymer or a rubber, a metal halide such as magnesium hydroxide or aluminum hydroxide, and a polymer having a carboxylic acid group.

Patent Document 2 proposes a flame retardant composition of an olefin-based resin, which has high flame retardancy imparted by adding a small amount of a silicone resin to a metal hydrate such as magnesium hydroxide.

Patent Document 3 proposes a flame retardant composition comprising a polyolefin-based resin with the addition of a metal hydrate, such as magnesium hydroxide or aluminum hydroxide, and a small amount of an organic clay.

In the flame retardants described in Patent Document 2 and Patent Document 3, magnesium hydroxide having a small particle diameter of about 1 μm is preferably used as the metal hydrate.

Patent Document 1: Japanese Unexamined Patent Application, First Publication No. Hei 5-239281
Patent Document 2: Japanese Unexamined Patent Application, First Publication No. Hei 5-54723
Patent Document 3: Japanese Unexamined Patent Application, First Publication No. 2003-197043

DISCLOSURE OF THE INVENTION

Problems to be Solved by the Invention

However, the flame retardant composition described in Patent Document 1 does not have satisfactory abrasion resistance since the amount of the metal hydrate is not reduced low enough.

In Patent Document 2 and Patent Document 3, the molded article does not have satisfactory flame retardancy, abrasion resistance and flexibility. Since magnesium hydroxide is expensive, it is preferably used in the smallest possible amount. In these proposals, however, the amount of the metal hydrate is not reduced low enough and a further improvement is required.

Considering the above, a metal hydrate such as magnesium hydroxide or aluminum hydroxide is currently the best candidate as a nonhalogen-based flame retardant, but is not positively replaced by the halogen-based flame retardant. In order to promote the substitution, it is necessary to reduce material cost of the flame retardant composition by further decreasing the amount of the metal hydrate to be used.

Under these circumstances, the present invention has been made and an object thereof is to provide a flame retardant capable of providing a molded article and an electric wire with a coating, which are excellent in flame retardancy, abrasion resistance and flexibility, and also have sufficient mechanical strength at low cost, and to provide a flame retardant composition using the same.

Solution for the Problems

In order to achieve the object described above, the present invention employed the following constitutions.
[1] A flame retardant that has a flame retardant (a) component, comprising 50 to 97% by mass of a metal hydrate (a-1)

component and 3 to 50% by mass of a filler (a-2) component, wherein the filler (a-2) component contains $SiO_2$, $Al_2O_3$ and $M_{2/n}O$.

Here, the total of the metal hydrate (a-1) component and the filler (a-2) component is 100% by mass, M represents one or more metal elements selected from a group consisting of K, Na, Mg, Ca, Fe and Zn, and n represents a valence of the metal element.

[2] The flame retardant according to [1], wherein the metal hydrate (a-1) component is a particulate magnesium hydroxide or a particulate aluminum hydroxide, and an average particle diameter of the component is 2 μm or less.

[3] The flame retardant according to [1] or [2], wherein the filler (a-2) component is a zeolite represented by a general formula: $xM_{2/n}O.Al_2O_3.ySiO_2.zH_2O$.

Here, M represents one or more metal elements selected from a group consisting of K, Na, Mg, Ca, Fe and Zn, n represents a valence of the metal element, and x, y and z represent arbitrary positive values.

[4] The flame retardant according to [3], wherein the zeolite is a synthetic zeolite and y in the general formula $xM_{2/n}O.Al_2O_3.ySiO_2.zH_2O$ is any one of 1 to 5.

[5] The flame retardant according to any one of [1] to [4], wherein a moisture content of the filler (a-2) component is 10% by mass or more.

[6] The flame retardant according to any one of [1] to [5], wherein a mass ratio (a-1)/(a-2) of the metal hydrate (a-1) and the filler (a-2) component is from 2.3 to 4.0.

[7] A flame retardant composition comprising an organic polymer material (b) component, and the flame retardant (a) component according to any one of [1] to [6] in an amount of 30 to 250 parts by mass based on 100 parts by mass of the organic polymer material (b) component.

[8] The flame retardant composition according to [7], wherein the organic polymer material (b) component comprises one or more selected from a group consisting of an α-olefin (co)polymer of 2 to 12 carbon atoms (b-1) component, a thermoplastic elastomer (b-2) component and a rubber (b-3) component; and 0.01 to 0.5% by mass of a constitutional unit derived from an unsaturated monomer having a carboxylic acid group or carboxylic anhydride group is contained in 100% by mass of the organic polymer material (b) component.

[9] A molded article using the flame retardant according to any one of [1] to [6].

[10] A molded article using the flame retardant composition according to any one of [7] to [8].

[11] An electric wire with a coating, using the flame retardant according to any one of [1] to [6].

[12] An electric wire with a coating, using the flame retardant composition according to any one of [7] to [8].

Effects of the Invention

According to the present invention, it is possible to provide a flame retardant capable of providing a molded article and an electric wire with a coating, which are excellent in flame retardancy, abrasion resistance and flexibility, and also have sufficient mechanical strength at low cost, and to provide a flame retardant composition using the same.

BEST MODE FOR CARRYING OUT THE INVENTION

<<Flame Retardant Component (a)>>

The flame retardant (a) component of the present invention (hereinafter also referred to as component (a)) comprises 50 to 97% by mass of a metal hydrate (a-1) component (hereinafter also referred to as component (a-1)) and 3 to 50% by mass of a filler (a-2) component (hereinafter also referred to as component (a-2)). Here, the total of the component (a-1) and the component (a-2) is 100% by mass, M represents one or more metal element selected from a group consisting of K, Na, Mg, Ca, Fe and Zn, and n represents a valence of this metal element.

<Metal Hydrate Component (a-1)>

As the metal hydrate (a-1) component, a hydrate of a metal compound, and a metal hydroxide are exemplified.

Examples of the hydrate of the metal compound include hydrates of sulfate, nitrate and carbonate of sodium, potassium, magnesium, calcium, copper and aluminum, and sodium sulfate decahydrate is exemplified as one example thereof. A hydrate of metal chloride such as calcium chloride dihydrate is also exemplified.

Examples of the metal hydroxide include hydroxides of various metals such as magnesium, aluminum, calcium, potassium, zinc and silicon. The metal hydroxide is regarded as a hydrate of a metal oxide.

These metal hydroxides can be used alone, or two or more kinds of them can also be used. Among these components (a-1), magnesium hydroxide or aluminum hydroxide is preferably used since they show excellent flame retardant effects and are inexpensive.

The component (a-1) may take a form of a crystal mass or particles. Although it is not particularly limited, the component is preferably in the form of particles.

In the case of granular magnesium hydroxide or aluminum hydroxide, the average particle diameter is preferably 20 μm or less, more preferably 10 μm or less, still more preferably 5 μm or less, and particularly preferably 2 μm or less, in view of flame retardancy and mechanical strength of the molded article. Since it becomes difficult to uniformly disperse the hydrate in the flame retardant composition when the average particle diameter is too small, the average particle diameter is preferably 0.01 μm or more.

The component (a-1) may be subjected to a surface treatment by adding a surface treating agent (a coupling agent) for the purpose of preventing aggregation of the component (a-1) and enhancing dispersibility with the component (b). Examples of the surface treating agent include fatty acid such as stearic acid, oleic acid and palmitic acid, or a metal salt thereof, wax, organotitanate and organosilane.

When the amount of the surface treating agent is large, the flame retardancy of the molded article deteriorates. Furthermore, the effect of coupling with a functional group in the component (b) may decrease, potentially resulting in deterioration of tensile characteristics and abrasion resistance of the molded article. Therefore, the amount of the metal hydrate (hereinafter also referred to as a substantial quantity of the component (a-1)) in the component (a-1) (100% by mass) is preferably 98% by mass or more, and more preferably 99% by mass or more.

The substantial quantity of the metal hydrate contained in the component (a-1) is measured in the following manner in the case of the component (a-1) containing magnesium hydroxide. 300 mg of the component (a-1) containing magnesium hydroxide is accurately weighed, wetted with about 1 mL of ethanol and then dissolved with heating after adding 12 mL of 1 mol/L hydrochloric acid. After cooling the lysate, water is added to accurately make up to 200 mL. Next, 10 mL of this solution is accurately weighed and about 80 mL of water is added, followed by neutralization with a 0.02 mol/L sodium hydroxide solution. Next, 2 mL of an ammonia-ammonium chloride buffer solution (pH 10.7) is added to prepare a solution. The solution thus prepared is titrated with a 0.01 mol/L disodium dihydrogen ethylenediamine tetraaoetate solution (EDTA) using an automatic titrator. In such a manner, the substantial quantity of the metal hydrate contained in the component (a-1) can be measured.

<Filler Component (a-2)>

The component (a-2) is a filler containing $SiO_2$, $Al_2O_3$ and $M_{2/n}O$ and, for example, zeolite, diatomaceous earth, clay, pyrophyllite, sericite, talc or the like can be exemplified. Among these, zeolite is preferred. The filler may be natural or synthetic as long as it contains the above components, and either filler exerts the effect. In the chemical formula, M represents one or more metal element selected from a group consisting of K, Na, Mg, Ca, Fe and Zn, n represents a valence of this metal element, and X, Y and Z are arbitrary positive values. These filler components can be used alone, or two or more kinds of them can also be used.

The zeolite is an alkali metal salt or an alkaline earth metal salt of a hydrous aluminosilicate represented by the general formula: $xM_{2/n}O.Al_2O_3.ySiO_2.zH_2O$, and a natural zeolite and a synthetic zeolite exist. M represents one or more metal element selected from a group consisting of K, Na, Mg, Ca, Fe and Zn, n represents a valence of this metal element, and x, y and z represent arbitrary positive values.

Zeolite is a porous crystal in which a $SiO_4$ tetrahedron and an $AlO_4$ tetrahedron are three-dimensionally bonded, and has a pore structure (microspace) called a channel or a cage in the crystal structure. The zeolite has ion exchange capacity, molecule adsorption effect, molecular sieve effect, high hygroscopicity or the like because of the pore structure in the crystal structure.

There exist plural types of crystal structures in zeolite depending on a difference in size of the channel and cage. The size of the channel and cage is mainly dependent on the fact that the polarity of an aluminosilicate skeleton varies depending on a difference in the proportion between Al and Si contained in the zeolite. The size of the channel and cage is determined by the polarity of this aluminosilicate skeleton and a valence of a metal contained in the zeolite. As the polarity of the aluminosilicate skeleton increases, ion exchange capacity and hygroscopicity of the zeolite increase.

In the general formula $xM_{2/n}O.Al_2O_3.ySiO_2.zH_2O$ of the zeolite, as the proportion of Si and Al approaches, the polarity increases. Therefore, zeolite (Y=2) in which the aluminosilicate skeleton exhibits a maximum polarity has a maximum ion exchange capacity and hygroscopicity among plural types of crystal structure.

The natural zeolite is classified into crystal structure types such as chabazite, clinoptilolite, erionite and mordenite.

The synthetic zeolite is classified into some crystal structure types such as type A, type Z, type X, type Y, type L, type PC, chabazite and mordenite.

The component (a-2) to be used may be either a natural zeolite or a synthetic zeolite, but preferably a synthetic zeolite is used and that of the general formula $xM_{2/n}O.Al_2O_3.ySiO_2.zH_2O$ in which y is from 1 to 5 is preferred. Further, y is preferably within a range from 1 to 3, and more preferably from 1.5 to 2.5. Specifically, a type A synthetic zeolite (y=2.0) is most preferred among other crystal structure types.

The type A zeolite includes type 3A in which a metal element M is K, type 4A in which M is Na, and type 5A in which M is Ca. In view of flame retardancy, type 4A and type 5A are preferred. The reason is considered to be because although it depends on a decomposition temperature of an organic polymer material described hereinafter, moisture is timely released when the organic polymer material component is decomposed.

The diatomaceous earth is a mineral produced by accumulating diatom and fossilizing this sediment over a long period. Examples of the diatomaceous earth include a natural dug product, a fired product, a flux fired product, a sodium carbonate fired product and the like. Although any type can exert the effect, a sodium carbonate fired product is preferred since coloration of a molded article can be prevented. The diatomaceous earth has general formula of $uNa_2O.vFe_2O_3.Al_2O_3.20$ to $30SiO_2.zH_2O$. In the formula, u, v and z represent arbitrary positive values.

Clay is a powder obtained by industrial purification of a natural kaolin mineral and contains, as a main component, kaolinite in the form of a hexagonal plate-like crystal. As the clay, a hard clay, a soft clay and a fired clay obtained by firing clay at about 600° C. are exemplified. Among these clays, a hard clay is most preferred. The clay is represented by general formula: $vFe_2O_3.wCaO.Al_2O_3.2SiO_2.zH_2O$. In the formula, v, w, and z represent arbitrary positive values.

Talc is a crystal containing magnesium silicate as a main component. The talc can be produced by grinding a natural ore as a raw material, followed by purification and classification using a dry method. The talc is represented by general formula: $vCaO.wFe_2O_3.Al_2O_3.7-120SiO_2.zH_2O$. In the formula, v, w and z represent arbitrary positive values.

In view of imparting flexibility to a molded article, an aspect ratio (a ratio of a length to a width of a particle) of the component (a-2) is preferably 2.0 or less, and more preferably 1.0 to 1.3.

In view of maintaining dispersibility in the flame retardant composition and mechanical strength of the molded article, the average particle diameter of the component (a-2) is preferably 40 μm or less, and more preferably 30 μm or less. In view of abrasion resistance and tensile elongation, the average particle diameter is particularly preferably 10 μm or less, and most preferably 5 μm or less. When the average particle diameter of the component (a-2) is less than 0.1 μm, it becomes difficult to mix it with an organic polymer material component (b) described hereinafter, which triggers a tendency of poor dispersion of the component (a), resulting in difficulty in providing intended physical properties.

The average particle diameter and the aspect ratio of the component (a-1) and the component (a-2) are measured by observation using a scanning electron microscope (SEM).

The component (a-2) can be subjected to a surface treatment by addition of a surface treating agent (a coupling agent) for the purpose of preventing aggregation of the component (a-2) and improving dispersibility with the component (b).

Examples of the surface treating agent include a fatty acid such as stearic acid, oleic acid, palmitic acid, or a metal salt thereof, wax, organotitanate, organosilane and the like.

When the amount of the surface treating agent is too large, flame retardancy of the molded article deteriorates and also the effect of coupling with a functional group in the component (b) decreases, and thus tensile characteristics and abrasion resistance of the molded article may deteriorate. Therefore, the amount of the filler (hereinafter also referred to as a substantial quantity of the component (a-2)) in the component (a-2) (100% by mass) is preferably 98% by mass or more, and more preferably 99% by mass or more. The substantial quantity of the component (a-2) is measured in the same manner as in the case of the component (a-1).

When the flame retardant of the present invention contains, in addition to the metal hydrate (a-1) component that has hitherto been used, a filler (a-2) component possessing an alumina silicate skeleton represented by zeolite, certain kinds of metal ions and crystal water, it is possible to obtain high flame retardancy, which has never been obtained, even if the flame retardant contains a small amount of the component (a-1).

Although a detailed mechanism is still unclear as to why flame retardancy is improved due to the component (a2), it is considered that a wet state of the component (a-2) exerts a large influence on flame retardancy of the flame retardant composition. The reason is considered as follows: moisture absorbed on the filler (a-2) is entrapped in pores of the component (a-2) when the moisture is kneaded with the organic polymer material, and the entrapped moisture is vaporized by temperature rise upon combustion thereby decreasing the combustion temperature and forming bubbles, and thus flame retardancy is exhibited.

Alternately, it is also considered that a pore structure of the component (a-2) contributes to a certain kind of ion-exchange reaction and traps a radical generated by thermolysis of the organic polymer material or an activated low molecular weight component, thus suppressing a combustion cycle. Herein, the combustion cycle means a mechanism for an organic polymer material to carry on continuous combustion. Specifically, first, the organic polymer material is thermally decomposed by heating and then a radical or a low molecular weight component generated by thermolysis is oxidized (combusted) in the air and, furthermore, oxidative heat is transmitted to the organic polymer material. The organic polymer material is further thermally decomposed by the transmitted oxidative heat and also a radical or a low molecular weight component generated newly by thermolysis is oxidized (combusted). Thus, the organic polymer material is continuously combusted by repeating such a cycle.

It is considered that the ion-exchange reaction is effectively expressed in the presence of sufficient moisture when the component (a-2) is kneaded with the organic polymer material (b) at a high temperature.

Therefore, the moisture content of the component (a-2) is preferably 10% by mass or more, more preferably 15% by mass or more, and particularly preferably 18% by mass or more, so as to improve flame retardancy furthermore. If the moisture content of the component (a-2) is 10% by mass or more, flame retardancy can be further improved. However, it is difficult to increase the moisture content to 35% by mass or more because of a limitation in an essential water absorption capacity of the component (a-2).

Herein, the moisture content is a value determined by the formula: (mass of moisture/mass of component (a-2) containing moisture)×100%.

In the flame retardant of the present invention, the proportion of the component (a-1) to the component (a-2) in 100% by mass of the component (a) is from 50 to 97% by mass in terms of the component (a-1) and from 3 to 50% by mass in terms of the component (a-2), as described above. The proportion of the component (a-1) is preferably from 60 to 90% by mass and that of the component (a-2) is preferably from 10 to 40% by mass, and the proportion of the component (a-1) is more preferably from 70 to 80% by mass and that of the component (a-2) is more preferably from 20 to 30% by mass. When the proportion of the component (a-1) is from 70 to 80% by mass and that of the component (a-2) is from 20 to 30% by mass (a mass ratio (a-1)/(a-2) is from 2.3 to 4.0), flame retardancy is effectively exhibited. Furthermore, when the mass ratio is from 2.3 to 3.3, flame retardancy is most improved.

When the proportion of the component (a-1) is less than 50% by mass, flame retardancy of the molded article deteriorates. When the proportion of the component (a-1) exceeds 97% by mass, mechanical strength such as tensile strength and tensile elongation of the molded article deteriorate, and also material cost increases, resulting in low economical efficiency.

In the above-described flame retardant of the present invention, satisfactory flame retardancy is secured by using the component (a-1) and the component (a-2) in combination even if the amount of the component (a-1) is less. Therefore, according to the flame retardant of the present invention, it is possible to obtain a molded article having excellent abrasion resistance and flexibility as well as satisfactory mechanical strength at low cost.

It is preferable to use the flame retardant (a) component of the present invention in combination with an organic polymer material (b) component described hereinafter. The object to be blended with the component (a) is not limited to the organic polymer material (b) component described hereinafter, and can be paper, cloth or lumber (including sawdust) as long as it is a material to which flame retardancy is to be imparted, and thus the object is not particularly limited.

<<Organic Polymer Material (b) Component>>

As the organic polymer material (b) component (hereinafter also referred to as a component (b)), a thermoplastic resin, a thermocurable resin or the like can be exemplified.

Examples of the thermoplastic resin include various olefin-based (co)polymers and derivatives thereof, such as polyethylene, polypropylene, poly-1-butene, poly-4-methyl-1-pentene, an ethylene-vinyl acetate copolymer, an ethylene-(meth)acrylic acid ester copolymer, an ethylene-(meth)acrylic acid copolymer, polymethyl methacrylate, or ionomers thereof, various polyolefin elastomers and the like. In addition, there can be exemplified a styrene-based copolymers such as polystyrene, an AS resin, an ABS resin, nonyl, SBS and SEBS; a polyester such as polyethylene terephthalate, polytrimethylene terephthalate, polybutylene terephthalate, polytetramethylene terephthalate, polyester elastomer and polylactic acid; a polyamide such as nylon-6, nylon-6,6, nylon-12 and polyamide elastomer; polycarbonate, polysulfone, polyethersulfone, polyether ether ketone, polyimide, polyetherimide, polyamideimide, polyphenylene oxide, polyacetal, polyphenylene sulfide, thermoplastic polyurethane, or mixtures of two or more kinds of them.

Examples of the thermocurable resin include a urethane resin, an epoxy resin, an unsaturated polyester resin, a urea resin, a melamine resin, a phenol resin and the like.

Among these components (b), various olefin-based (co)polymers and derivatives thereof are preferred. Polyolefin-based materials including various olefin-based (co)polymers and derivatives thereof are widely used materials and are inexpensive, and are also excellent in mechanical strength, heat resistance, chemical resistance, moldabaility, recycling properties or the like. Therefore, the polyolefin-based materials are used in wide fields such as various industrial materials, automobile components, household electrical appliances and packing material, and flame retardancy of the materials is largely demanded, and thus the polyolefin-based materials are suited for the use as the component (b), a target for flame retardancy of the present invention.

Furthermore, the component (b) is preferably at least one selected from a group consisting of an α-olefin (co)polymer of 2 to 12 carbon atoms (b-1) component (hereinafter also referred to as a component (b-1)), a thermoplastic elastomer (b-2) component (hereinafter also referred to as a component (b-2)), and a rubber (b-3) component (hereinafter also referred to as a component (b-3)).

<(Co)Polymer (b-1) Component of α-Olefin of 2 to 12 Carbon Atoms>

As the component (b-1), a homopolymer or a copolymer of ethylene, propylene, 1-butene, 4-methyl-1-pentene, 1-hexene, 1-octene, 1-dodecene or the like, and mixtures thereof are exemplified. Among these, components (b-1-1) to (b-1-4) shown below are preferred.

Component (b-1-1): any one of a propylene homopolymer, a random copolymer of propylene and ethylene, and a propylene-α-olefin block copolymer comprising propylene, ethylene and 1-butene Component (b-1-2): low-density polyethylene, or an ethylene-α-olefin copolymer Component (b-1-3): an ethylene-vinyl ester copolymer Component (b-1-4): an ethylene-α,β-unsaturated carboxylic acid alkyl ester copolymer These components may be used alone, or two or more kinds of them can be used in combination.

As the component (b-1-2), a low-density polyethylene (LDPE) having a density of 0.86 g/cm$^3$ or more and less than 0.94 g/cm$^3$ obtained by a high-pressure radical polymerization method, and a copolymer (ultralow-density polyethylene: VLDPE) of ethylene having a density of 0.86 g/cm$^3$ or more and less than 0.91 g/cm$^3$ and an α-olefin of 3 to 12 carbon atoms obtained by a middle-low pressure method using a Ziegler catalyst, or other known methods are exemplified. Also, a copolymer of ethylene having a density of 0.91 g/cm$^3$ or more and less than 0.94 g/cm$^3$ and an α-olefin of 3 to 12 carbon atoms (linear low-density polyethylene: LLDPE) is exemplified.

Examples of the α-olefin of 3 to 12 carbon atoms include propylene, 1-butene, 4-methyl-1-pentene, 1-hexene, 1-octene, 1-dodecene and the like. Among these, 1-butene, 4-methyl-1-pentene, 1-hexene and 1-octene are preferred, and 1-butene is particularly preferred.

The content of an α-olefin unit in an ethylene-α-olefin copolymer is preferably from 5 to 40 mol %.

VLDPE is polyethylene which has a density of 0.86 g/cm$^3$ or more and less than 0.91 g/cm$^3$, a maximum peak temperature (Tm) of 100° C. or higher when measured by a differential scanning calorimetry (DSC) method, a boiling n-hexane insoluble content of 10% by mass or more, and intermediate properties between LLDPE and an ethylene-α-olefin copolymer rubber. More specifically, VLDPE is polyethylene which is a copolymer of ethylene and an α-olefin of 3 to 12 carbon atoms, has both a high crystal portion of LLDPE and an amorphous portion of an ethylene-α-olefin copolymer rubber, and also has well-balanced properties in which mechanical strength and heat resistance as features of LLDPE, and self-stack, rubber-like elasticity and low temperature impact resistance as features of the ethylene-α-olefin copolymer rubber coexist. Therefore, VLDPE is extremely used as the component (b-1-2).

VLDPE is produced by using a catalyst system in which a solid catalyst component containing at least magnesium and titanium is combined with an organoaluminum compound.

The component (b-1-3) is a copolymer of ethylene as a main component, and a vinyl ester monomer such as vinyl propionate, vinyl acetate, vinyl caprate, vinyl caprylate, vinyl laurate, vinyl stearate and vinyl trifluoroacetate, which is produced by a high-pressure radical polymerization method. Among these, an ethylene-vinyl acetate copolymer (EVA) is particularly preferred. EVA is preferably a copolymer comprising 50 to 99.5% by mass of ethylene and 0.5 to 50% by mass of vinyl acetate, and particularly preferably a copolymer comprising 70 to 95% by mass of ethylene and 5 to 30% by mass of vinyl acetate because of physical and economical reasons.

The component (b-1-4) is preferably produced by a high-pressure radical polymerization method. Specific examples thereof include an ethylene-methyl (meth)acrylate copolymer, an ethylene-ethyl (meth)acrylate copolymer and the like. Among these, an ethylene-ethyl acrylate copolymer (EEA) is particularly preferred. EEA is preferably a copolymer comprising 50 to 99.5% by mass of ethylene and 0.5 to 50% by mass of an ethyl acrylate ester, and particularly preferably a copolymer comprising 70 to 95% by mass of ethylene and 5 to 30% by mass of an ethyl acrylate ester because of the physical and economical reasons.

The molt flow rate (indicator showing fluidity, hereinafter referred to as MFR) of the component (b-1) is preferably from 0.01 to 50 g/10 min, more preferably from 0.05 to 20 g/10 min, and still more preferably from 0.1 to 10 g/10 min. When MFR is less than 0.01 g/10 min, processability may potentially deteriorate. In contrast, when MER exceeds 50 g/10 min, the mechanical strength of the molded article may potentially deteriorate.

MFR is a value measured at a temperature of 210° C. under a load of 2.16 kg for the component containing an ethylene unit as a main component, or a value measured at a temperature of 230° C. under a load of 2.16 kg for the component containing a propylene unit as a main component.

<Thermoplastic Elastomer (b-2) Component>

The thermoplastic elastomer (b-2) component is usually composed of a hard component called as a hard segment and a soft component called as a soft segment. It has a feature of a rubber at a normal temperature since the hard segment functions as a crosslinking point, and also has a softening feature at a high temperature in the same way as a thermoplastic resin does, due to molten hard segment. Therefore, the thermoplastic elastomer is able to be molded by a molding machine such as compression, extrusion and injection molding machine. The thermoplastic elastomer requires merely a short molding cycle (time required for molding) and also enables recycling unlike other elastomers (rubbers) that have difficulty in doing so.

The thermoplastic elastomer as the component (b-2) is further classified into a styrene-based thermoplastic elastomer (SBC), an olefin-based thermoplastic elastomer (TPO), a urethane-based thermoplastic elastomer (PU), an ester-based thermoplastic elastomer (TPEE), an amide-based thermoplastic elastomer (TPAE) and the like. Among these, in view of mixability with the component (b-1), an olefin-based thermoplastic elastomer (b-2-1) component (also referred to as a component (b-2-1)) and a styrene-based thermoplastic elastomer (b-2-2) component (also referred to as a component (b-2-2)) are preferred. These components can be used alone, or two or more kinds of them can be used in combination.

(Olefin-Based Thermoplastic Elastomer (b-2-1) Component)

Since the proportion of a soft segment (elastomer component or xylene-soluble component) is 20% by mass or more, the olefin-based thermoplastic elastomer (b-2-1) component is distinguished from a soft polyolefin-based resin with a soft segment proportion of less than 20% by mass.

Furthermore, the component (b-2-1) is roughly classified into a simple blend type (b-2-1-1), a reactor made type (b-2-1-2) and dynamic vulcanization type (b-2-1-3), and each one has features described below.

The simple blend type olefin-based thermoplastic elastomer (b-2-1-1) is an olefin-based thermoplastic elastomer obtained by kneading and dispersing a polyolefin component and a rubber component using a Banbury mixer, a plasto mill, a twin screw extruder or the like. When the crosslinking degree of the rubber component increases too much, dispersibility of the rubber component deteriorates and the obtained olefin-based thermoplastic elastomer is inferior in physical properties, and thus a non-crosslinked rubber or a partially crosslinked rubber is used as the rubber component (rubber particle).

As the reactor made type olefin-based thermoplastic elastomer (b-2-1-2), for example, a propylene-α-olefin copolymer containing 40 to 80% by mass of a xylene-soluble component (an elastomer component) produced by a multi-stage polymerization method disclosed in Japanese Unexamined Patent Application, First Publication No. Hei 6-25367 is exemplified.

The multi-stage polymerization method is a method of producing an objective resin in a polymerization process comprising two or more stages. The polymerization process for providing the olefin-based thermoplastic elastomer comprises a step of producing a propylene homopolymer or a crystalline random copolymer of propylene and 5% by mass or less of an α-olefin other than propylene as a first stage, and a step of producing a random copolymer elastomer of ethylene and one or more kinds of α-olefin(s) of 3 or more carbon atoms as a second and subsequent stages.

Regarding the olefin-based thermoplastic elastomer obtained by this polymerization method, the resin components produced in each stage are blended in a reactor upon polymerization. Thereby, the ethylene-α-olefin random copolymer elastomer component is dispersed in the crystalline propylene resin produced in the first stage in the form of finer particles compared with those prepared by a conventional mechanical blending method.

The average particle diameter of the ethylene-α-olefin random copolymer elastomer component is preferably 5 μm or less, and particularly preferably 1 μm or less. The average particle diameter of the elastomer component can be measured by observation using a scanning electron microscope (SEM).

It is preferable that this elastomer component have not a clear island-in-sea structure, but has an interpenetrating network structure.

Regarding this elastomer component, when particles of the elastomer component having a large molecular weight are dispersed in the olefin-based thermoplastic elastomer in a micron order, dispersibility of the component (a), and low temperature characteristics and abrasion resistance of the obtained molded article are improved.

The ethylene-α-olefin random copolymer elastomer component is preferably an ethylene-propylene random copolymer or an ethylene-butene random copolymer. The content of an ethylene unit in the elastomer component is preferably controlled within a range from 15 to 50% by mass, and particularly from 20 to 40% by mass, so as to decrease the particle diameter of the elastomer component. When the content of the ethylene unit is less than 15% by mass or more than 50% by mass, the particle diameter of the elastomer component increases.

The amount of the xylene-soluble component of the propylene-α-olefin copolymer produced by the multi-stage polymerization method is preferably from 50 to 80% by mass, and particularly preferably from 55 to 75% by mass. When the amount of the xylene-soluble component is less than 50% by mass, dispersibility of the component (a), and flexibility and low temperature characteristics of the obtained molded article may be insufficient. In contrast, when the amount of the xylene-soluble component exceeds 80% by mass, the mechanical strength of the molded article may decrease, and also powder properties of the propylene-α-olefin copolymer may deteriorate, potentially resulting in poor handling upon compounding of the resin composition.

As the crystalline propylene resin in the propylene-α-olefin copolymer, a propylene homopolymer is preferably used in view of heat resistance and abrasion resistance.

Herein, a method for measurement of a xylene-soluble component is explained. First, 2.5 g of a resin to be measured is dissolved in 250 ml of xylem at 135° C. while stirring. After 20 minutes, the solution is cooled at 25° C. while stirring and let stand over 30 minutes until the insoluble component is sedimented. Filtrate is obtained by filtering the sedimented insoluble component. The thus obtained filtrate is vaporized under a nitrogen flow, and the residue is vacuum dried at 80° C. until the amount reaches to a constant weight. The residue thus obtained is weighed, and thus % by mass of a xylene-soluble component at 25° C. is determined.

As the dynamic vulcanization type olefin-based thermoplastic elastomer (b-2-1-3), for example, those described in Japanese Unexamined Patent Application, First Publication No. Hei 3-64341 are exemplified. Specific example is an olefin-based thermoplastic elastomer with a partial crosslinking structure, which is prepared by adding a random copolymer (EPDM) rubber, whose main components are a random copolymer (EPM) rubber containing propylene and ethylene as main components and a diene monomer (e.g., dicyclopentadiene and ethylidenenorbomene), to a matrix resin (any of a propylene homopolymer, random copolymer of propylene and ethylene or propylene-α-olefin block copolymer of propylene, ethylene and 1-butene), and kneading it while an organic peroxide and a crosslinking auxiliary are added to the respective components, so as to vulcanize the rubber component during a kneading process.

(Styrene-Based Thermoplastic Elastomer (b-2-2) Component)

The styrene-based thermoplastic elastomer (b-2-2) component is a block copolymer having a polystyrene block at the end, with an intermediate layer composed of polybutadiene, polyisoprene, an ethylene-butylene copolymer, an ethylene-propylene copolymer, or a butylene-propylene copolymer. Among these, a styrene-ethylene-butylene-styrene block copolymer (SEBS) is most preferred. The content of a styrene unit in SEBS is preferably from 20 to 40% by mass, and more preferably from 25 to 35% by mass. When the content of the styrene unit is less than 20% by mass, abrasion resistance of the molded article may deteriorate. In contrast, when the content of the styrene unit exceeds 40% by mass, dispersibility of the component (b-2-2) may deteriorate, thus making it impossible to exert the effect of improving mechanical characteristics of the molded article <Rubber (b-3) Component>

As the rubber (b-3) component, an ethylene-propylene-based rubber, a natural rubber, a nitrite rubber or the like can be exemplified. These rubber components may be used alone, or two or more kinds of them can be used in combination.

The component (b-3) may be any of a crosslinkable type, partially crosslinkable type and non-crosslinkable type.

As the ethylene-propylene-based rubber, a random copolymer (EPM) containing ethylene and propylene as main components, and a random copolymer (EPDM) mainly containing EPM added with a diene monomer (dicyclopentadiene, ethylidenenorbornene, etc.) as a third component are exemplified.

For the purpose of a coupling effect of the component (a) with the component (b), the component (b) preferably contains 0.01 to 0.5% by mass of a constitutional unit derived from an =saturated monomer having a carboxylic acid group or carboxylic anhydride group in the component (b) (100% by mass). The unsaturated monomer-derived constitutional unit contains an unreacted unsaturated monomer having a carboxylic acid group or carboxylic anhydride group.

When the content of the unsaturated monomer-derived constitutional unit is less than 0.01% by mass, the coupling effect with the flame retardant (a) component may become insufficient, resulting in drastic deterioration of abrasion resistance and mechanical strength such as tensile breaking strength of the molded article. In contrast, when the content of the unsaturated monomer-derived constitutional unit exceeds 0.5% by mass, fluidity of the obtained flame retardant composition may drastically deteriorate, resulting in a hindrance to the production process of the molded article.

Examples of the unsaturated monomer having a carboxylic acid group or carboxylic anhydride group include an $\alpha,\beta$-unsaturated dicarboxylic acid such as maleic acid, fumaric acid, citraconic acid, itaconic acid, or an anhydride thereof; and an unsaturated monocarboxylic acid such as acrylic acid, methacrylic acid, furan acid, crotonic acid, vinylacetic acid, pentenoic acid or the like. Among these, maleic acid and fumaric acid are particularly preferred. These unsaturated monomers can be used alone, or two or more kinds of them can be used in combination.

Examples of the method for introducing a constitutional unit derived from an unsaturated monomer having a carboxylic acid group or carboxylic anhydride group into the component (b) include (i) a method of graft-polymerizing the unsaturated monomer with one or more kinds of components (b-1), (b-2) and (b-3), (ii) a method of random-copolymerizing ethylene with the unsaturated monomer, and (iii) a method of melt-kneading one or more kinds of components (b-1), (b-2) and (b-3) with the unsaturated monomer in the presence of an organic peroxide and the like. An extruder can be used for the melt-kneading.

The method (i) is a method of graft-polymerizing the unsaturated monomer or an anhydride thereof with one or more kinds of components (b-1), (b-2) and (b-3) by a melting method or a solution method in the presence or absence of a radical initiator. For example, it is possible to obtain a meek acid-modified SEBS (MAH-SEBS) in which maleic acid is graft-polymerized with a styrene-ethylene-butylene-styrene block copolymer (SEBS) as the component (b-2-2). The graft polymerization method is preferably a melting method from an economical point of view. As the radical initiator, an organic peroxide, a dihydroaromatic compound, a dicumyl compound or the like can be exemplified.

Examples of the organic peroxide include hydroxy peroxide, dincumyl peroxide, t-butylcumyl peroxide, dialkyl(allyl) peroxide, diisopropylbenzene hydroperoxide, dipropionyl peroxide, dioctanoyl peroxide, benzoyl peroxide, peroxysuccinic sold, peroxyketal, 2,5-dimethyl-2,5-di-(t-butylperoxy)hexane, t-butyloxy acetate, t-butylperoxy isobutylate and the like.

Examples of the dihydroaromatic compound include dihydroquinoline or a derivative thereof, dihydrofuran, 1,2-dihydrobenzene, 1,2-dihydronaphthalene, 9,10-dihydrophenanthrene and the like.

Examples of the dinoutnyl compound include 2,3-dimethyl-2,3-diphenylbutane, 2,3-diethyl-2,3-diphenylbutane, 2,3-diethyl-2,3-di(p-methylphenyl)butane, 2,3-diethyl-2,3-(p-bromophenyl)butane and the like. Among these, 2,3-diethyl-2,3-diphenylbutane is preferred.

<<Flame Retardant Composition>>

It is preferable that the flame retardant composition of the present invention contain a flame retardant (a) component and an organic polymer material (b) component, and contain the component (a) in an amount of 30 to 250 parts by mass based on 100 parts by mass of the component (b). When the amount of the component (a) is less than 30 parts by mass, flame retardancy of the molded article is not sufficient. In contrast, when the amount of the component (a) exceeds 250 parts by mass, flexibility of the molded article deteriorates, and the obtained molded article is not suited for practical use. The amount of the component (a) is more preferably from 35 to 230 parts by mass and particularly preferably from 40 to 200 parts by mass, based on 100 parts by mass of the component (b).

The flame retardant composition of the present invention is prepared by continuously supplying an appropriate amount of each component using a quantitative feeder, or preblending each component using a high-speed mixer or tumbler such as a Henshel mixer, and kneading the obtained mixture using a known kneader such as a single screw extruder, a twin screw extruder, a Banbury mixer, a kneader, roll mill or the like. It is also possible that a portion (for example, a filler (a-2) component and a thermoplastic elastomer (b-2) component, etc.) of the components be preliminarily blended and kneaded furthermore to prepare a master batch, and this master batch be used for a kneading operation of a second stage.

The flame retardant composition of the present invention can contain an appropriate amount of various antioxidants such as phenol-based antioxidants, phosphorous-based antioxidants and sulfur-based antioxidants, coloring materials, nucleating additives, and antistatic agents; lubricants made of wax, paraffins, higher fatty acid, an ester thereof, amide or a metal salt, silicone, fluororesin and the like; and various adjuvant components such as slipping agents, processing aids, metal deactivators and ultraviolet inhibitors. When the flame retardant composition is used as a coating of an electric wire, phenol-based antioxidants and/or metal deactivators are preferably added to the component (b) in an amount of 1 to 2 parts by mass based thereon so as to prevent accelerated deterioration of the organic polymer material caused by a copper wire.

The phenol-based antioxidants and metal deactivators have the function of further improving flame retardancy since they can suppress oxidation of the organic polymer material.

Lubricants such as magnesium stearate have a function of further improving flame retardancy since they can improve dispersion of the flame retardant. It is considered that the lubricants also exert an effect of entrapping moisture taken into the component (a-2) by a capping process.

<<Molded Article>>

The molded article of the present invention is formed by using the flame retardant or the flame retardant composition of the present invention. Specifically, the molded article of the present invention is obtained by molding the flame retardant composition. The molding method of the molded article is not particularly limited and various known molding methods can be applied according to the applications. For example, an injection molding method, an extrusion molding method, a compression molding method, a hollow molding method or the like can be applied.

The flame retardant of the present invention and the flame retardant composition using the same can be utilized for various molded articles, and are suited for electric wire coating of automobile wire harnesses, connector components, tapes, coating of inner electric wires of electric appliances, coating of power source cords, wall papers, building material films, sheets, floor materials, pipes or the like.

The molded article of the present invention using the above flame retardant, a nonhalogen-based flame retardant, is able to reduce an influence of a halogen-containing combustion gas exerted on the environment, as well as generation of dioxins accompanied by incineration upon disposal. Furthermore, the molded article of the present invention is excellent in flame retardancy, abrasion resistance and flexibility, has satisfactory mechanical strength and realizes cost reduction, compared with those using a conventional nonhalogen-based flame retardant. Therefore, the molded article of the present invention can be widely used in place of a molded article using a conventional halogen-based flame retardant, or that comprising a conventional polyvinyl chloride.

In the present invention, even if papers, cloth and lumber (including sawdust) are impregnated with the flame retardant composition containing the component (a) and the component (b), the effect can be exerted. Furthermore, the component (a) can be added to any material other than the component (b), and also can impart flame retardancy to any material.

<<Electric Wire>>

The electric wire with a coating of the present invention is an electric wire with a coating using the flame retardant or the flame retardant composition of the present invention. Coating denoted herein is a primary coating formed around a conductor and/or secondary coating for coating an outer package of an electric wire.

The electric wire of the present invention can be widely used for automobile wire harnesses, inner electric wires of electric appliances, power source cords of electric appliances and power cables, indoor and outdoor wirings of buildings, factories and houses, and wiring of a sensor part of measuring equipment.

The electric wire with a coating using the flame retardant as a nonhalogen-based flame retardant is able to reduce an influence of a combustion gas containing halogen exerted an the environment, and generation of dioxins caused by incineration upon disposal. Furthermore, the electric wire with a coating of the present invention is excellent in flame retardancy, abrasion resistance and flexibility, has satisfactory mechanical strength, and realizes cost reduction, compared with an electric wire containing a conventional nonhalogen-based flame retardant in the coating material. Therefore, the electric wire with a coating of the present invention can be widely used in place of an electric wire containing a conventional halogen-based flame retardant, or an electric wire with a conventional polyvinyl chloride coating.

EXAMPLES

The following Examples further illustrate the present invention in detail. However, the present invention is not limited only to these Examples.

A component (a) and a component (b) used in the respective Examples are shown below. Xylene-soluble and xylene-insoluble contents in components, MFR and moisture content were measured by the following methods.

(Xylene-Soluble Content and Xylene-Insoluble Content)

While stirring, 2.5 g of a resin was dissolved in 250 ml of xylene at 135° C. After 20 minutes, the solution was cooled at 25° C. while stirring and the insoluble component was sedimented over 30 minutes. After the precipitate was filtered, the filtrate was vaporized under a nitrogen flow, allowed to stand at 80° C. until the amount of the residue reached a constant weight, and then vacuum dried. The residue thus obtained was weighed and % by mass of a xylene-soluble content at 25° C. was determined.

(MFR)

In accordance with JIS K7210, the measurement was conducted. In the case of a polypropylene-based resin, the measurement was conducted at 230° C. under a load of 2.16 kg. In the case of a polyethylene-based resin, the measurement was conducted at 190° C. under a load of 2.16 kg.

(Moisture Content)

The measurement was conducted at a measuring temperature of 180° C. by a moisture meter (CA-200, manufactured by Mitsubishi Chemical Corporation) using a Karl-Fisher method.

<<Component (a)>>

<Component (a-1)>

Product low surface-treated with magnesium hydroxide ($Mg(OH)_2$-(1)): manufactured by Kyowa Chemical Industry Co., Ltd., KISUMA 5AL, $Mg(OH)_2$ content=99.3% by mass, average particle diameter=0.8 μm, aspect ratio=4.

Product surface-treated with a magnesium hydroxide-silane coupling agent ($Mg(OH)_2$-(2)): manufactured by Kyowa Chemical Industry Co., Ltd., KISUMA 5P, $Mg(OH)_2$ content=99.5% by mass, average particle diameter=0.8 μm, aspect ratio=4.

Aluminum hydroxide ($Al(OH)_3$): manufactured by SHOWA DENKO K.K., HIGILITE H-42, $Al(OH)_3$ content=99.6, % by mass, average particle diameter=1.1 μm, aspect ratio=1.5.

<Component (a-2)>

Flux fired diatomaceous earth (diatomaceous earth-(1)): manufactured by Celite Corporation, SuperPine SuperFloss, average particle diameter=5 μm, aspect ratio=1.0. Chemical formula=$1.3Fe_2O_3.4.0Al_2O_3.90SiO_2.0.5H_2O$ ($0.3Fe_2O_3.Al_2O_3.22.5SiO_2.0.1H_2O$). Moisture content=15.2%.

Fired product diatomaceous earth (diatomaceous earth-(2)): manufactured by Celite Corporation, Celite 577, average particle diameter=21 μm, aspect ratio=1,2, chemical formula=$1.3Fe_2O_3.4.0Al_2O_3.90SiO_2.0.5H_2O$ ($0.3Fe_2O_3.Al_2O_3.22.5SiO_2.0.1H_2O$), moisture content=11.3%.

Flux fired diatomaceous earth (diatomaceous earth-(3)): manufactured by Celite Corporation, Celite503, average particle diameter=31.5 μm, aspect ratio=1.3, chemical formula=$1.2Fe_2O_3.3.2Al_2O_3.93SiO_2.0.1H_2O$ ($0.4Fe_2O_3.Al_2O_3.29.0SiO_2.0.03H_2O$), moisture content=12.6%.

PC type synthetic zeolite (zeolite-(1)): manufactured by MIZUSAWA INDUSTRIAL CHEMICALS, LTD., JC30, average particle diameter=3 μm, aspect ratio=1.0, Chemical formula=$x1Na_2O.x2CaO.Al_2O_3.3.0$ to $3.9SiO_2.zH_2O$ (x1+x2=1, numerical value of z is unknown), moisture content=11.2%.

4A type synthetic zeolite (zeolite-(2)): manufactured by MIZUSAWA INDUSTRIAL CHEMICALS, LTD., Silton B, average particle diameter=3.5 μm, aspect ratio=1.0, chemical formula=$Na_2O.Al_2O_3.2SiO_2.3.0$ to $4.5H_2O$, moisture content=21.1%.

X type synthetic zeolite (zeolite-(3)): manufactured by MIZUSAWA INDUSTRIAL CHEMICALS, LTD., Silton CPT-30, average particle diameter=3.1 μm, aspect ratio=1.0., chemical formula=$Na_2O.Al_2O_3.2$ to $3SiO_2.zH_2O$ (numerical value of z is known), moisture content=12.2%.

4A type synthetic zeolite (zeolite-(4)): manufactured by TOSOH CORPORATION, Zeolum A-4, average particle diameter=8.4 μm, aspect ratio=1.0, chemical formula=$Na_2O.Al_2O_3.2SiO_2.3.0$ to $4.5H_2O$, moisture content=5.8%, moisture content after moisture absorption=20.3%.

5A type synthetic zeolite (zeolite-(5)): manufactured by TOSOH CORPORATION, Zeolum A-5, average particle diameter=9.2 μm, aspect ratio=1.0, chemical formula=CaO.Al$_2$O$_3$.2SiO$_2$.3.0 to 4.5H$_2$O, moisture content=7.9%, moisture content after moisture absorption=17.8%.

4A type synthetic zeolite (zeolite-(6)): manufactured by ASAHI GLASS CO., LTD., zeolite powder, average particle diameter=2.1 μm, aspect ratio=1.0, chemical formula=Na$_2$O.Al$_2$O$_3$.2SiO$_2$.3.0 to 4.5H$_2$O, moisture content=8.5%, moisture content after moisture absorption=21.6%.

Moisture adsorption of zeolites-(4) to (6) was conducted by allowing them to stand in a thermo-hygrostat at 70° C. and relative humidity of 95% for 24 hours, followed by lowering the temperature down to room temperature (15° C. to 25° C.). After leaving them for 1 hour, 5 g of each sample was collected and a moisture absorption amount was measured. Simultaneously, weighing, mixing and kneading operations were conducted promptly to prepare a flame retardant composition.

<<Component (b)>>
<Component (b-1)>
Component (b-1-1)

Homopolypropylene (PP(1)HOMO): PS201A, manufactured by SunAllomer Ltd., MFR=0.5 g/10 min, xylene-soluble content=1.5% by mass.

Block polypropylene (PP(2)HECO): PB170A, manufactured by SunAllomer Ltd., MFR=0.3 g/10 min, xylene-soluble content=17% by mass.

Component (b-1-2)

Low-density polyethylene (LDPE): MIRASON 3530, manufactured by Mitsui Chemicals, Inc., MFR=0.23 g/10 min, density=0.924 g/cm$^3$.

Component (b-1-3)

Ethylene-vinyl acetate copolymer (EVA): manufactured by JAPAN POLYETHYLENE CORPORATION, NOVATEC EVA LV342, content of vinyl acetate unit=10% by mass, MPR=2.0 g/10 min.

Component (b-1-4)

Ethylene-ethyl acrylate copolymer (EEA): manufactured by Japanese Polyethylene Corporation, LEXPEARL EEA A1100, content of ethyl acrylate unit=10% by mass, MFR=0.4 g/10 min.

<Component (b-2)>
Component (b-2-1)

Multi-stage polymerization polypropylene copolymer (olefin-based elastomer (1)): Catalloy Q200F, manufactured by SunAllomer Ltd., MFR=0.8 g/10 min, xylene-soluble content=60% by mass.

Multi-stage polymerization polypropylene copolymer (olefin-based elastomer (2)): Catalloy Q020F, manufactured by SunAllomer Ltd., MPR=0.8 g/10 min, xylene-soluble content=70% by mass.

Partially crosslinked thermo olefin-based plastic elastomer (partially crosslinked TPO): Milastomer 9020N, manufactured by Mitsui Chemicals, Inc., MFR=12 g/10 min.

Component (b-2-2)

Maleic acid-modified SEBS (MAH-SEBS): Kraton FG1901X, manufactured by Kraton Polymers Co., content of styrene unit=28% by mass, MFR=22 g/10 min., content of a maleic anhydride derived constitutional unit in 100% by mass of MAH-SEBS=1.0% by mass.

Maleic acid-modified polypropylene (MAH-PP): Polybond 3200, manufactured by Chemitura Corporation, MFR=250 g/10 min., content of a maleic anhydride-derived constitutional unit in 100% by mass of MAH-PP=1.0% by mass.

Maleic anhydride-derived constitutional unit: parts by mass of MAH-PP or a maleic anhydride-derived constitutional unit contained in MAH-PP in 100 parts by mass of a component (b). The maleic anhydride-derived constitutional unit corresponds to an unsaturated monomer having a carboxylic acid group or a carboxylic anhydride group-derived constitutional unit contained preferably in the present invention.

<Component (b-3)>

Rubber: TAFMER P-0280, manufactured by Mitsui Chemicals, Inc., MFR=2.9 g/10 min, xylene-soluble content=99% by mass.

<<Other Components>>

Antioxidant: Irganox 1010, manufactured by Ciba Specialty Chemicals Inc.

Metal deactivator: Irganox MD1024, manufactured by Ciba Specialty Chemicals Inc.

Slipping agent: EMS-6P, manufactured by Eishin Kasei Co., Ltd.

Examples 1 to 29, Comparative Examples 1 to 12

The respective components in each Example were blended as shown in Tables 1 and 2, and the respective components in Comparative Example 1 were blended as shown in Table 3, followed by mixing them using a Henshel mixer having a volume of 20 liters and further kneading them at a dice temperature of 200° C. using a same direction twin screw extruder having a diameter of 30 mm to produce pellets of a flame retardant composition.

Using a T-die having a width of 100 m attached to the tip of an extruder having a diameter of 30 mm, 0.2 mm thick sheets were molded from the pellets of the flame retardant composition at a molding temperature of 230° C. and a take-up speed of 2.0 m/min.

Using a cross head dice attached to an extruder having a diameter of 20 mm, a single-wire type copper wire having a diameter of 0.7 mm was coated with the flame retardant composition in a thickness of 0.2 mm to produce an electric wire with a coating of the flame retardant composition. The dice temperature was set at 230° C., and the take-up speed was set at 10 m/min.

With respect to the obtained sheet and electric wire with a coating, the following evaluations were conducted. Regarding the results of the tensile test, data in a flow direction of a T-die sheet were employed.

(Tensile Test)

No. 3 dumbbell shape tension test specimens defined in JIS K6251 were punched out from a sheet and then subjected to a tensile test at room temperature (23° C.), a pulling rate of 200 mm/min, a distance between chucks of 60 mm and a distance between two gauge length Lo of 20 mm. A tensile strength was calculated by dividing the strength upon breaking of the test specimen by a minimum cross-sectional area. The punch-out direction was determined as the sheet flow direction corresponded to the tensile direction upon a test.

A tensile elongation was calculated by the formula: (L=L0)/L0×10, where L denotes a gauge length.

The tensile strength and tensile elongation serve as an indicator of an intensity of the mechanical strength. As the values of tensile strength and tensile elongation become higher, the mechanical strength is evaluated as being higher.

Young's modulus E was determined by the following procedure. Using a load-displacement curve in which the displacement was plotted against the load obtained by the tensile test, a tangent line was drawn on an initial straight line of this load-displacement curve. After setting any two points on the tangent line, E was calculated by the equation: $E=\Delta\sigma/\Delta\epsilon$, where $\Delta\sigma$ denotes a difference in stress due to an average cross-sectional area of two points on the tangent line, and $\Delta\epsilon$ denotes a difference in strain between the same two points. As the Young's modulus becomes higher, flexibility becomes lower, whereas, as the Young's modulus becomes lower, flexibility becomes higher.

(Abrasion Resistance)

An electric wire with a coating of a flame retardant composition was subjected to an abrasion test under a load of 7N using a piano wire having a diameter of 0.45 mm as a blade according to the blade reciprocation method defined in JASO D611-12-(2). The number of reciprocations of the blade was measured until the coating of the electric wire was fractured.

(Combustion Test)

An electric wire with a coating of a flame retardant composition was subjected to a combustion test. Regarding Examples and Comparative Examples in which the amount of a component (a) in the flame retardant composition was less than 150 parts by mass, a 45° combustion test described in JIS C3005 was conducted. After the electric wire was exposed to flame for 10 seconds, the time required until extinction was measured to obtain a flame-out time. When the flame-out time is within 70 seconds, it is possible to rate as satisfactory flame retardancy.

Regarding Examples and Comparative Examples in which the amount of a component (a) in the flame retardant composition was 150 parts by mass or more, the measurement was conducted by a UL-94 vertical combustion method in compliance with JIS K7106, and then it was referred to as vertical flame retardancy.

TABLE 1

| Classification | Components or Evaluation items | Unit | Example 1 | Example 2 | Example 3 | Example 4 | Example 5 | Example 6 | Example 7 |
|---|---|---|---|---|---|---|---|---|---|
| Component (a-1) | Low surface treated Mg(OH)$_2$-(1) | Parts by mass | 45 | 45 | 45 | 45 | 45 | 40 | |
| | Silane surface treated Mg(OH)$_2$-(2) | Parts by mass | | | | | | | |
| | Al(OH)$_3$ | Parts by mass | | | | | | | 40 |
| Component (a-2) | Diatomaceous earth-(1) | Parts by mass | 5 | | | | | | |
| | Diatomaceous earth-(2) | Parts by mass | | 5 | | | | | |
| | Zeolite-(1) | Parts by mass | | | 5 | | | | |
| | Zeolite-(2) | Parts by mass | | | | 5 | | 5 | 5 |
| | Zeolite-(3) | Parts by mass | | | | | 5 | | |
| | Total of component (a) | Parts by mass | 50 | 50 | 50 | 50 | 50 | 45 | 45 |
| Component (b-1-1) | PP(1)HOMO | Parts by mass | | | | | | | |
| | PP(2)HEGO | Parts by mass | 80 | 80 | 80 | 80 | 80 | | |
| Component (b-1-2) | LDPE | Parts by mass | | | | | | | |
| Component (b-1-3) | EVA | Parts by mass | | | | | | 40 | 40 |
| Component (b-1-4) | EEA | Parts by mass | | | | | | 40 | 40 |
| Component (b-2-1) | Olefin-based elastomer-(1) | Parts by mass | | | | | | | |
| | Olefin-based elastomer-(2) | Parts by mass | | | | | | | |
| | Partially crosslinked TPO | Parts by mass | | | | | | | |
| Component (b-2-2) | MAH-SEBS | Parts by mass | | | | | | | |
| | MAH-PP | Parts by mass | 20 | 20 | 20 | 20 | 20 | 20 | 20 |
| | Constitutional unit derived from maleic anhydride | Parts by mass | 0.2 | 0.2 | 0.2 | 0.2 | 0.2 | 0.2 | 0.2 |
| Component (b-3) | Rubber | Parts by mass | | | | | | | |
| | Total of component (b) | Parts by mass | 100 | 100 | 100 | 100 | 100 | 100 | 100 |
| Other components | Antioxidant | Parts by mass | 1.7 | 1.7 | 1.7 | 1.7 | 1.7 | 1.7 | 1.7 |
| | Metal deactivator | Parts by mass | 1.7 | 1.7 | 1.7 | 1.7 | 1.7 | 1.7 | 1.7 |
| | Slipping agent | Parts by mass | 0.3 | 0.3 | 0.3 | 0.3 | 0.3 | 0.3 | 0.3 |
| Evaluation | Tensile strength | MPa | 29 | 27 | 29 | 31 | 28 | 28 | 24 |
| | Tensile elongation | % | 280 | 280 | 300 | 310 | 280 | 400 | 330 |
| | Young's modulus | MPa | 2750 | 2680 | 2780 | 2890 | 2750 | 2100 | 2350 |
| | Abrasion resistance (7N load) | Times | 83 | 78 | 98 | 91 | 75 | 42 | 44 |
| | Flame-out time | Seconds | 65 | 70 | 62 | 58 | 70 | 57 | 63 |
| | Vertical flame resistance | | — | — | — | — | — | — | — |

| Classification | Components or Evaluation items | Unit | Example 8 | Example 9 | Example 10 | Example 11 | Example 12 | Example 13 |
|---|---|---|---|---|---|---|---|---|
| Component (a-1) | Low surface treated Mg(OH)$_2$-(1) | Parts by mass | 45 | 40 | 40 | 40 | 40 | 30 |
| | Silane surface treated Mg(OH)$_2$-(2) | Parts by mass | | | | | | |
| | Al(OH)$_3$ | Parts by mass | | | | | | |
| Component (a-2) | Diatomaceous earth-(1) | Parts by mass | 5 | 10 | | | | |
| | Diatomaceous earth-(2) | Parts by mass | | | 10 | | | |
| | Zeolite-(1) | Parts by mass | | | | 10 | | |
| | Zeolite-(2) | Parts by mass | | | | | 10 | 10 |
| | Zeolite-(3) | Parts by mass | | | | | | |
| | Total of component (a) | Parts by mass | 50 | 50 | 50 | 50 | 50 | 40 |
| Component (b-1-1) | PP(1)HOMO | Parts by mass | | 40 | 40 | 40 | 40 | 40 |
| | PP(2)HEGO | Parts by mass | 70 | | | | | |
| Component (b-1-2) | LDPE | Parts by mass | 10 | 10 | 10 | 10 | 10 | 10 |
| Component (b-1-3) | EVA | Parts by mass | | | | | | |
| Component (b-1-4) | EEA | Parts by mass | | | | | | |
| Component (b-2-1) | Olefin-based elastomer-(1) | Parts by mass | | 30 | 30 | 30 | 30 | 30 |
| | Olefin-based elastomer-(2) | Parts by mass | | | | | | |
| | Partially crosslinked TPO | Parts by mass | | | | | | |

TABLE 1-continued

| Component | | | | | | | | |
|---|---|---|---|---|---|---|---|---|
| (b-2-2) | MAH-SEBS | Parts by mass | | | | | | |
| | MAH-PP | Parts by mass | 20 | 20 | 20 | 20 | 20 | 20 |
| | Constitutional unit derived from maleic anhydride | Parts by mass | 0.2 | 0.2 | 0.2 | 0.2 | 0.2 | 0.2 |
| Component (b-3) | Rubber | Parts by mass | | | | | | |
| | Total of component (b) | Parts by mass | 100 | 100 | 100 | 100 | 100 | 100 |
| Other components | Antioxidant | Parts by mass | 1.7 | 1.7 | 1.7 | 1.7 | 1.7 | 1.7 |
| | Metal deactivator | Parts by mass | 1.7 | 1.7 | 1.7 | 1.7 | 1.7 | 1.7 |
| | Slipping agent | Parts by mass | 0.3 | 0.3 | 0.3 | 0.3 | 0.3 | 0.3 |
| Evaluation | Tensile strength | MPa | 32 | 38 | 33 | 40 | 42 | 43 |
| | Tensile elongation | % | 350 | 420 | 290 | 450 | 510 | 560 |
| | Young's modulus | MPa | 2200 | 2030 | 1990 | 1950 | 1750 | 1630 |
| | Abrasion resistance (7N load) | Times | 70 | 55 | 45 | 90 | 65 | 45 |
| | Flame-out time | Seconds | 65 | 66 | 69 | 68 | 55 | 45 |
| | Vertical flame resistance | | — | — | — | — | — | — |

TABLE 2

| Classification | Components or Evaluation Items | Unit | Ex. 14 | Ex. 15 | Ex. 16 | Ex. 17 | Ex. 18 | Ex. 19 | Ex. 20 | Ex. 21 |
|---|---|---|---|---|---|---|---|---|---|---|
| Component (a-1) | Low surface treated Mg(OH)$_2$-(1) | Parts by mass | | 40 | 40 | 40 | 40 | 45 | 40 | 150 |
| | Silane surface treated Mg(OH)$_2$-(2) | Parts by mass | 40 | | | | | | | |
| | Al(OH)$_2$ | Parts by mass | | | | | | | | |
| Component (a-2) | Diatomaceous earth-(1) | Parts by mass | | | | | | | | |
| | Diatomaceous earth-(2) | Parts by mass | | | | | | | | |
| | Diatomaceous earth-(3) | Parts by mass | | | | | | 5 | | |
| | Zeolite-(1) | Parts by mass | | | | | | | | |
| | Zeolite-(2) | Parts by mass | 10 | 10 | 10 | 10 | 10 | | | 15 |
| | Zeolite-(3) | Parts by mass | | | | | | | 10 | |
| | Moisture adsorbed Zeolite-(4) | Parts by mass | | | | | | | | |
| | Moisture adsorbed Zeolite-(5) | Parts by mass | | | | | | | | |
| | Moisture adsorbed Zeolite-(6) | Parts by mass | | | | | | | | |
| | Moisture unadsorbed Zeolite-(4) | Parts by mass | | | | | | | | |
| | Moisture unadsorbed Zeolite-(5) | Parts by mass | | | | | | | | |
| | Moisture unadsorbed Zeolite-(6) | Parts by mass | | | | | | | | |
| | Total of component (a) | Parts by mass | 50 | 50 | 50 | 50 | 50 | 50 | 50 | 165 |
| Component (b-1-1) | PP(1)HOMO | Parts by mass | 40 | 40 | 60 | | | | 60 | |
| | PP(2)HEGO | Parts by mass | | | | 30 | 10 | 80 | | |
| Component (b-1-2) | LDPE | Parts by mass | 10 | 10 | 10 | 10 | 10 | | 10 | |
| Component (b-1-3) | EVA | Parts by mass | | | | 20 | 20 | | | |
| Component (b-1-4) | EEA | Parts by mass | | | | 20 | 20 | | | |
| Component (b-2-1) | Olefin-based elastomer-(1) | Parts by mass | 30 | | 10 | | | | 20 | 90 |
| | Olefin-based elastomer-(2) | Parts by mass | | | | | | | | |
| | Partially Crosslinked TPO | Parts by mass | | 30 | | | | | | |
| Component (b-2-2) | MAH-SEBS | Parts by mass | | | | 20 | 20 | | | |
| | MAH-PP | Parts by mass | 20 | 20 | | 20 | 20 | | | |
| | Constitutional unit derived from maleic anhydride | Parts by mass | 0.2 | 0.2 | 0.2 | 0.2 | 0.2 | 0.2 | 0.2 | 0.1 |
| Component (b-3) | Rubber | Parts by mass | | | | | | 20 | | |
| | Total of component (b) | | 100 | 100 | 100 | 100 | 100 | 100 | 100 | 100 |
| Other components | Antioxidant | Parts by mass | 1.7 | 1.7 | 1.7 | 1.7 | 1.7 | 1.7 | 1.7 | 1.7 |
| | Metal deactivator | Parts by mass | 1.7 | 1.7 | 1.7 | 1.7 | 1.7 | 1.7 | 1.7 | 1.7 |
| | Slipping agent | Parts by mass | 0.3 | 0.3 | 0.3 | 0.3 | 0.3 | 0.3 | 0.3 | 0.3 |
| Evaluation | Tensile strength | MPa | 41 | 33 | 40 | 35 | 37 | 22 | 36 | 17 |
| | Tensile Elongation | % | 400 | 320 | 520 | 460 | 380 | 100 | 490 | 230 |
| | Young's modulus | MPa | 2200 | 2100 | 2050 | 1890 | 2100 | 2920 | 2070 | 180 |
| | Abrasion resistance (7N load) | Times | 95 | 60 | 105 | 53 | 75 | 60 | 22 | — |
| | Flame-out time | Seconds | 50 | 48 | 57 | 50 | 52 | 95 | 62 | — |
| | Vertical flame resistance | | — | — | — | — | — | — | — | — |

| Classification | Components or Evaluation Items | Unit | Ex. 22 | Ex. 23 | Ex. 24 | Ex. 25 | Ex. 26 | Ex. 27 | Ex. 28 | Ex. 29 |
|---|---|---|---|---|---|---|---|---|---|---|
| Component (a-1) | Low surface treated Mg(OH)$_2$-(1) | Parts by mass | 150 | 250 | 30 | 30 | 30 | 30 | 30 | 30 |
| | Silane surface treated Mg(OH)$_2$-(2) | Parts by mass | | | | | | | | |
| | Al(OH)$_2$ | Parts by mass | | | | | | | | |
| Component (a-2) | Diatomaceous earth-(1) | Parts by mass | | | | | | | | |
| | Diatomaceous earth-(2) | Parts by mass | | | | | | | | |
| | Diatomaceous earth-(3) | Parts by mass | | | | | | | | |
| | Zeolite-(1) | Parts by mass | | | | | | | | |
| | Zeolite-(2) | Parts by mass | 15 | 15 | | | | | | |
| | Zeolite-(3) | Parts by mass | | | | | | | | |
| | Moisture adsorbed Zeolite-(4) | Parts by mass | | | 10 | | | | | |
| | Moisture adsorbed Zeolite-(5) | Parts by mass | | | | 10 | | | | |
| | Moisture adsorbed Zeolite-(6) | Parts by mass | | | | | 10 | | | |
| | Moisture unadsorbed Zeolite-(4) | Parts by mass | | | | | | 10 | | |

TABLE 2-continued

| Classification | Components or Evaluation items | Unit | | | | | | | | |
|---|---|---|---|---|---|---|---|---|---|---|
| | Moisture unadsorbed Zeolite-(5) | Parts by mass | | | | | | | 10 | |
| | Moisture unadsorbed Zeolite-(6) | Parts by mass | | | | | | | | 10 |
| | Total of component (a) | Parts by mass | 165 | 265 | 40 | 40 | 40 | 40 | 40 | 40 |
| Component (b-1-1) | PP(1)HOMO | Parts by mass | | | 40 | 40 | 40 | 40 | 40 | 40 |
| | PP(2)HEGO | Parts by mass | | | | | | | | |
| Component (b-1-2) | LDPE | Parts by mass | | | 10 | 10 | 10 | 10 | 10 | 10 |
| Component (b-1-3) | EVA | Parts by mass | | | | | | | | |
| Component (b-1-4) | EEA | Parts by mass | | | | | | | | |
| Component (b-2-1) | Olefin-based elastomer-(1) | Parts by mass | | 90 | 30 | 30 | 30 | 30 | 30 | 30 |
| | Olefin-based elastomer-(2) | Parts by mass | 80 | | | | | | | |
| | Partially Crosslinked TPO | Parts by mass | | | | | | | | |
| Component (b-2-2) | MAH-SEBS | Parts by mass | | 10 | 20 | 20 | | | | |
| | MAH-PP | Parts by mass | 20 | | 20 | 20 | 20 | 20 | 20 | 20 |
| | Constitutional unit derived from maleic anhydride | Parts by mass | 0.2 | 0.2 | 0.2 | 0.2 | 0.2 | 0.2 | 0.2 | 0.1 |
| Component (b-3) | Rubber | Parts by mass | | | | | 20 | | | |
| | Total of component (b) | | 100 | 100 | 100 | 100 | 100 | 100 | 100 | 100 |
| Other components | Antioxidant | Parts by mass | 1.7 | 1.7 | 1.7 | 1.7 | 1.7 | 1.7 | 1.7 | 1.7 |
| | Metal deactivator | Parts by mass | 1.7 | 1.7 | 1.7 | 1.7 | 1.7 | 1.7 | 1.7 | 1.7 |
| | Slipping agent | Parts by mass | 0.3 | 0.3 | 0.3 | 0.3 | 0.3 | 0.3 | 0.3 | 0.3 |
| Evaluation | Tensile strength | MPa | 19 | 9 | 28 | 26 | 41 | 28 | 27 | 40 |
| | Tensile Elongation | % | 210 | 30 | 320 | 250 | 500 | 330 | 280 | 490 |
| | Young's modulus | MPa | 220 | 550 | 1780 | 1820 | 1600 | 1750 | 1800 | 1620 |
| | Abrasion resistance (7N load) | Times | — | — | 38 | 35 | 44 | 35 | 36 | 43 |
| | Flame-out time | Seconds | 50 | 48 | 57 | 50 | 52 | 95 | 62 | — |
| | Vertical flame resistance | | — | V-O | V-O | — | — | — | — | — |

TABLE 3

| Classification | Components or Evaluation items | Unit | Comparative Example 1 | Comparative Example 2 | Comparative Example 3 | Comparative Example 4 | Comparative Example 5 | Comparative Example 6 |
|---|---|---|---|---|---|---|---|---|
| Component (a-1) | Low surface treated Mg(OH)$_2$-(1) | Parts by mass | 70 | 50 | 49 | 23 | 45 | 50 |
| | Silane surface treated Mg(OH)$_2$-(2) | Parts by mass | | | | | | |
| | Al(OH)$_3$ | Parts by mass | | | | | | |
| Component (a-2) | Diatomaceous earth-(1) | Parts by mass | | | 1 | 27 | | |
| | Diatomaceous earth-(2) | Parts by mass | | | | | | |
| | Zeolite-(1) | Parts by mass | | | | | | |
| | Zeolite-(2) | Parts by mass | | | | | | |
| | Total of component (a) | Parts by mass | 70 | 50 | 50 | 50 | 45 | 50 |
| Component (b-1-1) | PP(1)HOMO | Parts by mass | | | | | | |
| | PP(2)HEGO | Parts by mass | 80 | 80 | 80 | 80 | | 70 |
| Component (b-1-2) | LDPE | Parts by mass | | | | | 40 | 10 |
| Component (b-1-3) | EVA | Parts by mass | | | | | 40 | |
| Component (b-1-4) | EEA | Parts by mass | | | | | | |
| Component (b-2-1) | Olefin-based elastomer-(1) | Parts by mass | | | | | | |
| | Olefin-based elastomer-(2) | Parts by mass | | | | | | |
| | Partially crosslinked TPO | Parts by mass | | | | | | |
| Component (b-2-2) | MAH-SEBS | Parts by mass | | | | | | |
| | MAH-PP | Parts by mass | 20 | 20 | 20 | 20 | 20 | 20 |
| | Constitutional unit derived from maleic anhydride | Parts by mass | 0.2 | 0.2 | 0.2 | 0.2 | 0.2 | 0.2 |
| Component (b-3) | Rubber | Parts by mass | | | | | | |
| | Total of component (b) | Parts by mass | 100 | 100 | 100 | 100 | 100 | 100 |
| Other components | Antioxidant | Parts by mass | 1.7 | 1.7 | 1.7 | 1.7 | 1.7 | 1.7 |
| | Metal deactivator | Parts by mass | 1.7 | 1.7 | 1.7 | 1.7 | 1.7 | 1.7 |
| | Slipping agent | Parts by mass | 0.3 | 0.3 | 0.3 | 0.3 | 0.3 | 0.3 |
| Evaluation | Tensile strength | MPa | 30 | 30 | 30 | 27 | 27 | 32 |
| | Tensile elongation | % | 190 | 280 | 180 | 260 | 410 | 320 |
| | Young's modulus | MPa | 3270 | 2760 | 2740 | 2530 | 2050 | 2200 |
| | Abrasion resistance (7N load) | Times | 116 | 90 | 95 | 84 | 40 | 75 |
| | Flame-out time | Seconds | 70 | 120 | 115 | 103 | 107 | 120 |
| | Vertical flame resistance | | — | — | — | — | — | — |

TABLE 3-continued

| Classification | Components or Evaluation items | Unit | Comparative Example 7 | Comparative Example 8 | Comparative Example 9 | Comparative Example 10 | Comparative Example 11 | Comparative Example 12 |
|---|---|---|---|---|---|---|---|---|
| Component (a-1) | Low surface treated Mg(OH)$_2$-(1) | Parts by mass | 70 | 50 | 49 | 23 | 200 | 40 |
| | Silane surface treated Mg(OH)$_2$-(2) | Parts by mass | | | | | | |
| | Al(OH)$_3$ | Parts by mass | | | | | | |
| Component (a-2) | Diatomaceous earth-(1) | Parts by mass | | | | | | |
| | Diatomaceous earth-(2) | Parts by mass | | | | | | |
| | Zeolite-(1) | Parts by mass | | | | | | |
| | Zeolite-(2) | Parts by mass | | | 1 | 27 | | |
| | Total of component (a) | Parts by mass | 70 | 50 | 50 | 50 | 200 | 40 |
| Component (b-1-1) | PP(1)HOMO | Parts by mass | 40 | 40 | 40 | 40 | | 40 |
| | PP(2)HEGO | Parts by mass | | | | | | |
| Component (b-1-2) | LDPE | Parts by mass | 10 | 10 | 10 | 10 | | 10 |
| Component (b-1-3) | EVA | Parts by mass | | | | | | |
| Component (b-1-4) | EEA | Parts by mass | | | | | | |
| Component (b-2-1) | Olefin-based elastomer-(1) | Parts by mass | 30 | 30 | 30 | 30 | 90 | 30 |
| | Olefin-based elastomer-(2) | Parts by mass | | | | | | |
| | Partially crosslinked TPO | Parts by mass | | | | | | |
| Component (b-2-2) | MAH-SEBS | Parts by mass | | | | | 10 | |
| | MAH-PP | Parts by mass | 20 | 20 | 20 | 20 | | 20 |
| | Constitutional unit derived from maleic anhydride | Parts by mass | 0.2 | 0.2 | 0.2 | 0.2 | 0.1 | 0.2 |
| Component (b-3) | Rubber | Parts by mass | | | | | | |
| | Total of component (b) | Parts by mass | 100 | 100 | 100 | 100 | 100 | 100 |
| Other components | Antioxidant | Parts by mass | 1.7 | 1.7 | 1.7 | 1.7 | 1.7 | 1.7 |
| | Metal deactivator | Parts by mass | 1.7 | 1.7 | 1.7 | 1.7 | 1.7 | 1.7 |
| | Slipping agent | Parts by mass | 0.3 | 0.3 | 0.3 | 0.3 | 0.3 | 0.3 |
| Evaluation | Tensile strength | MPa | 37 | 40 | 40 | 46 | 15 | 38 |
| | Tensile elongation | % | 420 | 470 | 460 | 400 | 120 | 470 |
| | Young's modulus | MPa | 2600 | 2200 | 2150 | 2430 | 320 | 1580 |
| | Abrasion resistance (7N load) | Times | 63 | 47 | 44 | 47 | — | 43 |
| | Flame-out time | Seconds | 65 | 110 | 105 | 97 | — | burned down |
| | Vertical flame resistance | — | — | — | — | — | V-2 | — |

Comparative Examples 1 and 2 are examples in which a filler (a-2) component was not added as a flame retardant (a) component and only a metal hydrate (a-1) component was used. Comparative Example 1 in which an amount of the component (a-1) was larger by as much as 70 parts by mass exhibited a flame-out time) (45°) of 70 seconds or less, but exhibited a high Young's modulus (flexibility is low). Comparative Example 2 in which the amount of the component (a-1) was 50 parts by mass and was smaller than that in the case of Comparative Example 1 showed satisfactory flexibility and mechanical strength. However, a flame-out time (45°) exceeded 70 seconds, failing to provide sufficient flame retardancy.

In contrast, in the case of Examples 1 to 5 in which the metal hydrate (a-1) component was used in combination with a component (a-2), a flame-out time (45°) was 70 seconds or less, and also the amount of component (a-1) was successfully reduced by about 20 parts by mass relative to Comparative Example 1. Also, excellent tensile elongation and low Young's modulus (high flexibility) were confirmed.

As a result, it was confirmed that both flame retardancy and flexibility were not satisfied concurrently by the component (a-1) alone and that the component (a-2) was necessary in order to reconcile flame retardancy and flexibility.

Comparative Example 3 is an example in which each component was the same as that of Example 1, except that the added amount of the component (a-2) was less than the lower limit of the present invention, and it was confirmed that the flame-out time (45°) exceeded 70 seconds and flame retardancy was inferior.

Comparative Example 4 is an example in which each component was the same as that of Example 1, except that the added amount of the component (a-2) exceeded the upper limit of the present invention, and it was also confirmed that the flame-out time (45°) exceeded 70 seconds and flame retardancy was inferior.

In the case of Examples 6 and 7, the amount of the component (a) was further decreased successfully compared with Examples 1 to 5 by using an ethylene-vinyl acetate copolymer (EVA) as a component (b-1-3) and an ethylene-ethyl acrylate copolymer (EEA) as a component (b-1-4) which are preferably used as a component (b-1). This suggested that these components (b) were effective for further reducing the amount of the component (a-1) used.

Comparative Example 5 is an example in which the component (a) of Example 6 is replaced by the component (a-1) alone. Comparative Example 6 is an example in which the component (a) of Example 7 is replaced by the component (a-1) alone. It was confirmed that both Comparative Examples 5 and 6 were inferior in flame retardancy since the flame-out time (45°) exceeded 70 seconds.

As a result, it was confirmed that the component (a-2) was necessary regardless of selection of component (b) and also the amount of the component (a-2) in the component (a) must be adjusted within a scope of the present invention so as to obtain satisfactory flame retardancy.

Example 8 is an example using a block polypropylene (PP(2)HECO) as a component (b-1-1) and a low-density polyethylene (LDPE) as a component (b-1-2) in combination as the component (b), which exhibited excellent tensile strength and tensile elongation, along with satisfactory flame retardancy.

Examples 9 to 13 are examples in which a homopolypropylene (PP(1)HOMO) as a component (b-1-1) a low-density polyethylene (LDPE) as a component (b-1-2) and an olefin-based elastomer (1) as a component (b-2-1) were used as a component (b), as well as various other components (a-2) being used, and all Examples exhibited satisfactory flame retardancy. Furthermore, Young's modulus was low (flexibility was high), mechanical strength such as tensile strength and tensile elongation was satisfactory, and also these characteristics exhibited satisfactory balance. Among these examples, Example 12 using zeolite-(2) exhibited excellent flame retardancy (a short flame-out time), flexibility, tensile strength and tensile elongation, highly embracing these various characteristics.

In contrast, it was confirmed that Comparative Examples 7 and 8 which contained the same organic polymer material component (b) as that in Examples 9 to 13, but without component (a-2), and Comparative Examples 9 and 10 in which the amount of the component (a-2) did not meet a defined amount of the present invention, exhibited high Young's modulus (low flexibility), flame-out time ($45°$) of more than 70 seconds, and inferior flame retardancy.

As a result, it was confirmed that the component (a-2) was necessary regardless of selection of component (b) and also the amount of the component (a-2) in the component (a) had to satisfy the defined amount of the present invention so as to reconcile flexibility and flame retardancy.

Example 14 is an example in which a product surface-treated with a magnesium hydroxide-silane coupling agent is used as the component (a-1), Example 15 is an example in which a partially crosslinked TPO contains the component (b), Examples 16 and 17 are examples in which maleic acid-modified SEBS contains the component (b), and Example 18 is an example in which a rubber as a component (b-3) contains the component (b). All of these Examples exhibited excellent flame retardancy and low Young's modulus (high flexibility), and also exhibited satisfactory results with respect to mechanical strength and abrasion resistance.

Example 19 is an example in which a diatomaceous earth-(3) having an average particle diameter of more than 30 μm was used as the component (a-2). The tensile strength and tensile elongation were low, but other evaluations were satisfactory.

Example 20 is an example which does not contain a constitutional unit derived from an unsaturated monomer having a carboxylic acid group or carboxylic anhydride group, a preferable constituent contained in the component (b), that is, it is an example in which MAH-SEBS and MAH-PP containing a maleic anhydride-derived constitutional unit according to the present example is not used. It exhibited poor abrasion resistance, but other evaluations were satisfactory. This suggested that it is preferable to contain a constitutional unit derived from an unsaturated monomer having a carboxylic acid group or carboxylic anhydride group so as to improve abrasion resistance.

Examples 21 and 22 are highly flame retarding examples in which the amount of the component (a) relative to 100 parts by mass of a component (b) is increased within the range defined by the present invention. Both examples exhibited excellent vertical flame retardancy.

Example 23 is an example in which the amount of the component (a-1) is further increased compared with that in Example 21 within the range defined by the present invention. Although inferior in tensile elongation and tensile strength as an indicator of mechanical strength compared with Example 21, it exhibited satisfactory vertical flame retardancy.

Comparative Example 11 is an example in which the component (a-1) alone was used as the component (a) in Example 21. It was inferior in vertical flame retardancy.

Examples 24, 25 and 26 are examples in which moisture-absorbed zeolites-(4), (5) and (6) were used. Examples 24 and 25 using zeolites-(4) and (5) having a large particle size were slightly inferior in tensile characteristics, but exhibited excellent flame retardancy. Examples 27, 28 and 29 using moisture-nonabsorbed zeolites-(4), (5) and (6) were inferior in flame retardancy since the moisture content was less than 10% by mass, but had sufficient flexibility and tensile performance. Comparative Example 12 containing only metal hydrate (a-1) was burned down. Therefore, even if the moisture content is less than 10% by mass, the effect of improving flame retardancy is recognized.

INDUSTRIAL APPLICABILITY

According to the present invention, it is possible to provide a flame retardant capable of providing a molded article and an electric wire with a coating, which are excellent in flame retardancy, abrasion resistance and flexibility, and also have sufficient mechanical strength at low cost, and to provide a flame retardant composition using the same. The flame retardant of the present invention and the flame retardant composition using the same are suitable for electric wire coatings of automobile wire harnesses, connector components, tapes, inner electric wires for electric appliances, coatings of power source cords, wall papers, building material films, sheets, floor materials and pipes, which require high flame retardancy, flexibility and heat resistance. The flame retardant of the present invention is a nonhalogen-based flame retardant and, a molded article using the same of the present invention can suppress an influence of a combustion gas containing halogen exerting on the environment, and generation of dioxins due to incineration upon disposal. Furthermore, electric wire with a coating composed of the flame retardant of the present invention composition is excellent in flame retardancy, abrasion resistance and flexibility, has sufficient mechanical strength, and also realizes coat reduction compared with a conventional electric wire with a coating containing a nonhalogen-based flame retardant.

Therefore, a molded article using the flame retardant of the present invention and the flame retardant composition using the same, and an electric wire with a coating can be widely used in place of a conventional molded article using a halogen-based flame retardant, an electric wire using a halogen-based flame retardant as a coating, or a conventional molded article composed of vinyl chloride and an electric wire coated with polyvinyl chloride.

The invention claimed is:

1. A flame retardant that has a flame retardant (a) component, comprising 50 to 97% by mass of a metal hydrate (a-1) component and 3 to 50% by mass of a filler (a-2) component, where the total of the metal hydrate (a-1) component and the filler (a-2) component is 100% by mass, wherein the filler (a-2) component is a zeolite represented by a general formula: $xM_{2/n}O \cdot Al_2O_3 \cdot ySiO_2 \cdot zH_2O$, where M represents one or more metal elements selected from a group consisting of K, Na, Mg, Ca, Fe and Zn, n represents a valence of the metal element, and x, y and z represent arbitrary positive values; and wherein a moisture content of the filler (a-2) component is 10% by mass or more.

2. The flame retardant according to claim 1, wherein the metal hydrate (a-1) component is a particulate magnesium hydroxide or a particulate aluminum hydroxide, and average particle diameter of the component is 2 μm or less.

3. The flame retardant according to claim 1, wherein the zeolite is a synthetic zeolite and y in the general formula $xM_{2/n}O.Al_2O_3.ySiO_2.zH_2O$ is any one of 1 to 5.

4. The flame retardant according to claim 1, wherein a mass ratio (a-1)/(a-2) of the metal hydrate (a-1) and the filler (a-2) component is from 2.3 to 4.0.

5. A flame retardant according to claim 1, wherein the flame retardant (a) component comprises 70 to 80% by mass of the metal hydrate (a-1) component and 20 to 30% by mass of the filler (a-2) component.

* * * * *